(12) United States Patent
Gautama (10) Patent No.: US 9,042,561 B2
(45) Date of Patent: May 26, 2015

(54) CONTROL OF A LOUDSPEAKER OUTPUT (75) Inventor: Temujin Gautama, Boutersem (BE)

(73) Assignee: NXP B.V., Eindhoven (NL)

( * ) Notice: Subject to any disclaimer, the term of this patent is extended or adjusted under 35 U.S.C. 154(b) by 269 days.

(21) Appl. No.: 13/619,126

(22) Filed: Sep. 14, 2012

(65) Prior Publication Data

US 2013/0251167 A1 Sep. 26, 2013

(30) Foreign Application Priority Data

Sep. 28, 2011 (EP) .................................... 11183182

(51) Int. Cl.
| | | |
|---|---|---|
| *H03G 11/00* | (2006.01) | |
| *H04R 29/00* | (2006.01) | |
| *H04B 3/23* | (2006.01) | |
| *H04R 3/00* | (2006.01) | |

(52) U.S. Cl.
CPC . *H04B 3/23* (2013.01); *H04R 3/007* (2013.01)

(58) Field of Classification Search
None
See application file for complete search history.

(56) References Cited

U.S. PATENT DOCUMENTS

| | | |
|---|---|---|
| 4,709,391 A | 11/1987 | Kaizer et al. |
| 5,438,625 A | 8/1995 | Klippel |
| 5,600,718 A | 2/1997 | Dent et al. |
| 6,201,873 B1 | 3/2001 | Dal Farra |
| 7,372,966 B2 | 5/2008 | Bright |
| 8,019,088 B2 * | 9/2011 | Holman .......................... 381/55 |
| 2010/0092004 A1 | 4/2010 | Kuze |
| 2011/0182435 A1 | 7/2011 | Gautama |
| 2012/0121098 A1 | 5/2012 | Gautama |
| 2013/0251167 A1 * | 9/2013 | Gautama .......................... 381/66 |

OTHER PUBLICATIONS

Klippel, W. "Tutorial: Loudspeaker Nonlinearities—Causes, Parameters, Symptoms", J. Audio Eng. Soc., vol. 54, No. 10, pp. 907-939 (2006).
Extended European Search Report for European Patent Appln. No. 11183182.2 (Feb. 21, 2012).

\* cited by examiner

*Primary Examiner* — Regina N Holder (57) ABSTRACT

A loudspeaker drive circuit has a microphone which forms part of an acoustic echo cancellation system. An input signal is processed before application to a loudspeaker driver, and the processing is controlled in dependence on the echo cancellation system performance, such as to control the extent to which the loudspeaker is driven into a non-linear operating region. In this way, the linearity can be controlled so as to provide an excursion limit, without needing a model of the loudspeaker or additional dedicated sensors.

15 Claims, 5 Drawing Sheets

CONTROL OF A LOUDSPEAKER OUTPUT

CROSS-REFERENCE TO RELATED APPLICATIONS

This application claims the priority under 35 U.S.C. §119 of European patent application no. 11183182.2, filed on Sep. 28, 2011, the contents of which are incorporated by reference herein.

This invention relates to the control of the output of a loudspeaker.

A loudspeaker is a device that converts an electrical signal into an acoustic one. For small electrical signals, for which the diaphragm displacement is small, an accurate linear transfer function can be defined between the input voltage signal and the acoustic sound pressure. However, for input signals that result in a larger displacement, the linear model is invalid, due to the non-linear behaviour of the loudspeaker, and the acoustical output is distorted. There exist many studies into the origin and the modelling of loudspeaker distortions.

When a loudspeaker is driven into its non-linear behaviour, audible distortions occur, and for severe non-linearities, the expected life-time of the loudspeaker can decrease.

An important cause of loudspeaker failures is a mechanical defect that arises when the loudspeaker diaphragm is displaced beyond a certain limit, which is usually supplied by the manufacturer. Going beyond this displacement limit either damages the loudspeaker immediately, or can considerably reduce its expected life-time.

Furthermore, the combination of the use of small loudspeakers and the demand for high acoustic output, indicates the need for loudness maximisation methods, but these increase the risk of exceeding the diaphragm displacement limit, also referred to as the 'cone excursion' limit.

In a loudspeaker loudness maximisation approach, when the displacement limit is not reached, this can be obtained by processing the input signal in such a way that the acoustical output is enhanced, while staying within the displacement limits of the loudspeaker. Such loudspeaker-based processing can consist of filtering operations or dynamic range compression algorithms, where the parameters of the dynamic range compressor are adapted in such a way that the distortion arising from excessive loudspeaker excursion is reduced when necessary.

There exist several methods to limit/maximise the displacement of the diaphragm of a loudspeaker, and they can be divided into three categories.

(i) The first category consists of methods that process the input signal with variable cut-off filters (high-pass or other), the characteristics of which are controlled via a feedback loop. The measured control signal is referred to as the displacement predictor.

(ii) The second category consists of methods that also use a displacement predictor, but which feed it back into the input signal.

(iii) The third category comprises methods that process the signal with a bank of band-pass filters with adjustable gains in such a way that excess excursion is prevented (by attenuating only the frequency bands that cause most excursion).

This third category of methods uses a feedforward strategy. The use of a shelving filter has also been proposed in such a feedforward approach (in U.S. Pat. No. 7,372,966), which is controlled via the displacement predictor in a feedforward manner, using a model of the loudspeaker to pre-process the signal before sending it to the amplifier/loudspeaker.

These methods generally either require additional sensors to monitor the behaviour of the loudspeaker, or they use a fixed model of the loudspeaker.

If an additional sensor is used, it is not traditionally included in the device, such as a motion sensor for measuring the diaphragm displacement signal, or a current sensor to measure the electrical current flowing into the loudspeaker voice coil.

When a fixed model of a loudspeaker is used to perform loudspeaker protection, the model needs to be estimated, often a single time for a certain type and model of device. Therefore, these methods do not take into account the variability across device samples, nor the effect of loudspeaker heating and aging.

According to the invention, there is provided a loudspeaker drive circuit comprising:
 a loudspeaker driver;
 an input for receiving a signal from a microphone which detects the sound output of the loudspeaker;
 means for detecting non-linearity between the drive signal to the loudspeaker and the microphone signal; and
 a processor for processing an input signal before application to the loudspeaker driver, wherein the processor is adapted to control the processor in dependence on the detected non-linearity, such as to control the extent to which the loudspeaker is driven into a non-linear operating region.

The invention is based on the use of a microphone to indirectly monitor the diaphragm displacement, namely via the presence of non-linearities in the echo path (between loudspeaker and microphone). This adjusts the processing of the input signal such that the non-linearities are reduced. In this way, the invention can provide a maximisation of the acoustic output, while ensuring that the loudspeaker is not driven beyond its displacement limit.

A microphone is a sensor that is available in many devices, such as mobile phones, laptops and PDAs. The invention can be implemented in these devices, and therefore it becomes possible to perform mechanical loudspeaker protection without the need for additional sensors.

An acoustic echo cancellation system can be used, wherein the means for detecting non-linearity between the drive signal to the loudspeaker and the microphone signal comprises means for determining a performance of the echo cancellation system.

In this way, the invention can be implemented as an adaptive method that continuously updates based on the current echo cancellation performance, and therefore takes into account the variability and the effects of heating and aging.

The processor can comprise one or more of:
 means for implementing dynamic range compression with a variable threshold value at which there is a knee in the dynamic range compression function;
 means for implementing a variable gain; and
 means for implementing a filter function with variable cut-off frequency.

These measures enable the input signal to be processed so as to lower the diaphragm displacement, when this is necessary to prevent damage to the loudspeaker.

The acoustic echo cancellation system can comprise a delay element for delaying the drive signal to the loudspeaker, a filter for implementing a variable transfer function and a comparator for comparing the microphone signal with the delayed and filtered drive signal, and controlling the variable transfer function in response to the comparison result.

This is a known system for providing echo cancellation, in which the filter generates an estimated echo signal, which is subtracted from the recorded echo signal. The subtraction result can be used as a measure of the echo cancellation performance and can thus be used as an input to the processor. The echo-return-loss-enhancement (ERLE) performance of the acoustic echo cancellation system can be used as the input to the processor.

In one example, the echo-return-loss-enhancement is not allowed to drop below a threshold level. This limits the diaphragm displacement when needed. In another example, the echo-return-loss-enhancement is maintained at a threshold level. This can be used to provide loudness maximisation.

A loudspeaker circuit comprises a drive circuit of the invention and a loudspeaker driven by the drive circuit.

The invention also provides a method of controlling a loudspeaker, comprising:

detecting the sound output of the loudspeaker using a microphone;

detecting non-linearity between the drive signal to the loudspeaker and the microphone signal; and processing an input signal before application to the loudspeaker driver, to control the processor in dependence on the detected non-linearity, such as to control the extent to which the loudspeaker is driven into a non-linear operating region.

Examples of the invention will now be described in detail with reference to the accompanying drawings, in which.

The invention provides a loudspeaker drive circuit having a microphone which forms part of an acoustic echo cancellation system. An input signal is processed before application to a loudspeaker driver, and the processing is controlled in dependence on the echo cancellation system setting, such as to control the extent to which the loudspeaker is driven into a non-linear operating region. In this way, the linearity can be controlled so as to provide an excursion limit, without needing a model of the loudspeaker or additional dedicated sensors.

The drive circuit of the invention enables an input signal to be processed in such a way that the distortions observable in the acoustic output of the device are small. It can be implemented in a device that has one or several loudspeakers for reproducing audio, a sensor for capturing sound (such as one or several microphones), and a DSP or micro-controller, which generates the digital output signal(s) and receives the digital input sensor signal(s).

Figure 1:
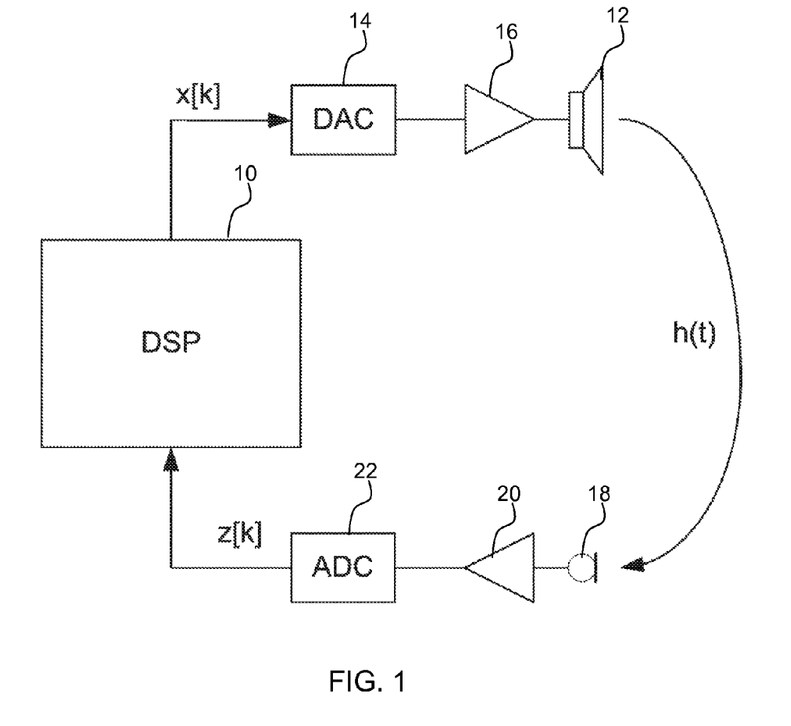
FIG. 1 shows in schematic form a loudspeaker system of the invention.

FIG. 1 shows in schematic form the components of the system of the invention.

A digital signal processor (DSP) 10 performs the processing of the system. The output signals from the DSP, x[k], are sent to one or several loudspeakers 12 via a digital-to-analog converter (DAC) 14 and an amplifier 16. The digital source signal can be obtained from memory, or received from a different module (such as the received signal of a voice communications system).

The input signals to the DSP, z[k], are obtained from one or more sensor(s) in the form of at least one microphone 18 via an amplifier 20 and an analog-to-digital converter (ADC) 22. These signals typically contain the 'acoustical echo' of the acoustical signal reproduced by the loudspeaker 12, ambient noise, and other external signals (e.g., speech).

Figure 2:
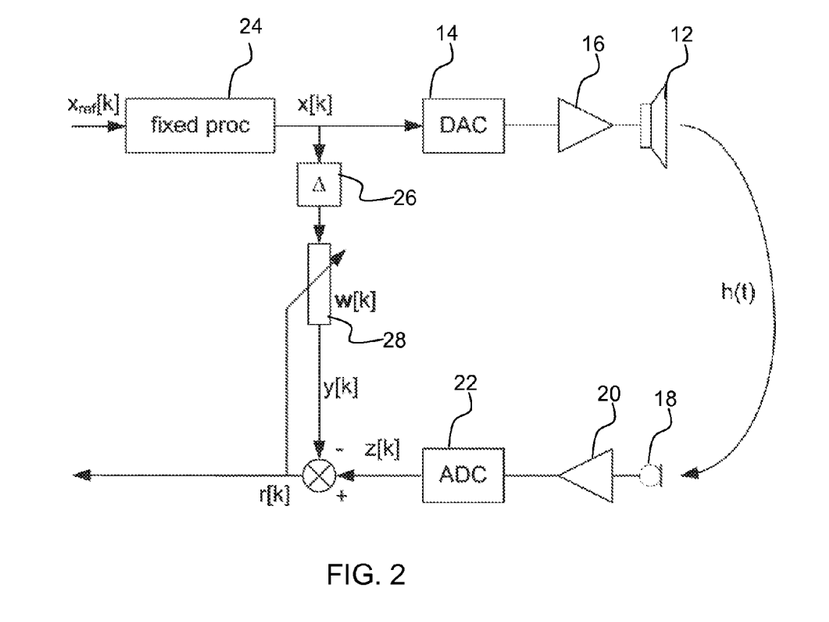
FIG. 2 shows a traditional acoustic echo canceller (AEC)

The 'acoustical echo path' filter, h(t), characterises the transfer from the acoustic output of the loudspeaker to the input of the microphone. FIG. 2 shows a known acoustic echo canceller (AEC). The digital input signal, $x_{ref}[k]$ is (optionally) processed by a fixed processing module 24 ("fixed proc"), yielding x[k]. This processing can consist of a gain, a fixed dynamic range compression operation, a filtering operation, or even an adaptive processing for example to improve speech intelligibility (in the current context, it is still referred to as 'fixed', because it is not implementing the adaptive control of the invention described below).

The output signal, x[k], is sent to the loudspeaker, and also, via a delay line 26 (Δ), to an adaptive filter 28, w[k], yielding the filter output y[k]. The filter output, y[k], is subtracted from the microphone signal, z[k], yielding the residual signal, r[k]. The subtraction function can of course be considered to be a comparison function. The signal y[k] comprises an echo estimate.

The coefficients of the adaptive filter 28 are adapted in such a way that, for example, the signal power in the residual signal is minimised in a least-squares sense. The filter output y[k] represents the linearly correlated portion between x[k] and z[k]. Therefore, sources in z[k] that are not linearly correlated to x[k] (such as speech and ambient noise) are still present in the signal after echo cancellation r[k].

This system is well-known and used, and has been shown to yield good performance when the signal path from x[k] to z[k] is linear, i.e., when the acoustic echo path, h(t), is linear and the output amplifier and loudspeaker behave in a linear fashion.

Performance can be measured by means of the echo-return-loss-enhancement (ERLE), which is the attenuation of the echo signal as it passes through the send path of an echo canceller. Another measure can be obtained from the 'stability' of the filter coefficients: nonlinearities induce jitter on the coefficients.

Figure 3:
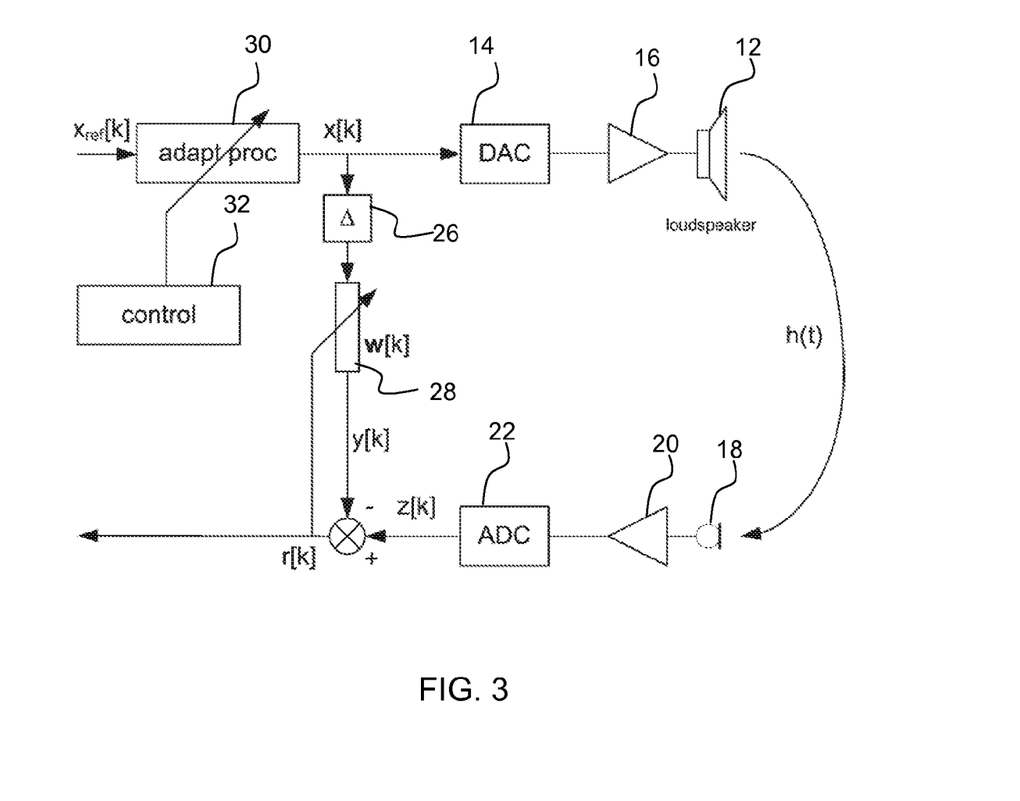
FIG. 3 shows a loudspeaker system of the invention.

The system of the invention is shown in FIG. 3. The module 24 of FIG. 2 has been replaced by an adaptive processing module 30 "adapt proc" and a control module 32 controls the processing applied.

This module 30 may consist of a gain, a dynamic range compression operation, a filtering operation, or a combination thereof (this list is not exhaustive and other types of processing are possible as well). The parameters of these operations are adapted by the control module. The control module adjusts the parameters of the processing module 30 in such a way that the loudspeaker is not driven too far into its non-linear behaviour. As will be explained below, the assessment that the loudspeaker is operating non-linearly is based on the performance of the echo cancellation system.

Non-linearities in a device such as shown in FIG. 1 can have several causes, among which saturation of the amplifiers, saturation of the ADC, and non-linear behaviour of the loudspeaker. The non-linearities caused by the ADC and the sensor amplifier are not relevant in the current context, since they can be avoided by careful design.

Each of the remaining non-linearities (saturation of the output amplifier and non-linear behaviour of the loudspeaker) influences the signal path between x[k] and z[k] in a non-linear fashion.

The major causes of non-linear behaviour of a loudspeaker are linked to the diaphragm displacement. For small signals, for which the displacement is small, the loudspeaker behaves linearly, and as the displacement increases, the non-linearities become more prominent. Therefore, it is possible to limit the diaphragm displacement by limiting the presence of non-linearities.

In one example, the invention uses the acoustic echo cancellation system as a means of measuring the degree of non-linearity, based on a microphone signal. The non-linearity of the signal path from x[k] to z[k] can be estimated using the known acoustic echo canceller, such as that shown in FIG. 2. In particular, the performance and/or stability of the echo canceller changes in response to a non-linear signal path, so that the performance and/or stability can be used as a measure of non-linearity.

FIG. 2 shows only a single input channel and a single output channel, although the invention applies to multiple channels as well. The linear adaptive filter approach to echo cancellation assumes that the signal path between x[k] and z[k] is linear. Any non-linearity in this signal path, which includes the acoustic echo path, h(t), the amplifiers, the sensor and the loudspeaker, will result in a reduced performance (e.g., a reduced ERLE). Therefore, a low performance of the AEC indicates a presence of non-linearities in the signal path, which can be attributed to the output amplifier or the loudspeaker, but also to the vibration of the housing of the device.

The effect of the processing module 30 on the presence of non-linearities is now discussed.

For three types of processing which can be applied by the processing module 30 (a gain, a DRC and a high-pass filter) a parameter that controls the processing is varied, and the effect is evaluated for two different music segments (solid and dashed lines in the figures).

For a 10-second segment of music playback on a device with a loudspeaker and a microphone, the maximal diaphragm displacement has been measured using a laser displacement meter, for different values of the parameter. This gives an indication of the non-linear behaviour of the loudspeaker (the amplifier does not show any non-linear behaviour in these experiments), since the loudspeaker non-linearities are tightly linked to the diaphragm displacement. For larger displacements, the loudspeaker non-linearities are more prominent.

For each 10-second segment, the ERLE has been computed as the signal power ratio between the microphone signal and the residual signal. This is a possible measure for evaluating the non-linearity and, indirectly, the diaphragm displacement (as recognised by the invention).

Figure 4:
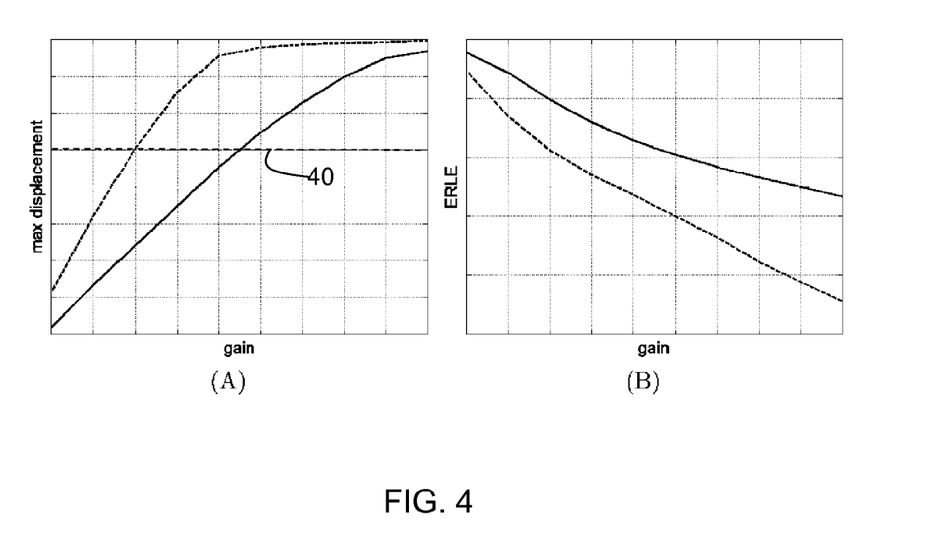
FIG. 4 is used to show the effect of a gain on the maximum displacement (FIG. 4A) and on the ERLE (FIG. 4B)

The effect of a gain is illustrated in FIG. 4 for two music segments. FIG. 4A shows that the maximal displacement increases when the gain increases. The maximally allowed displacement that is provided by the manufacturer is represented by the dashed, horizontal line 40.

FIG. 4B shows that the ERLE decreases as a function of the gain, indicating that the non-linear behaviour of the loudspeaker becomes more prominent as the gain increases.

Figure 5:
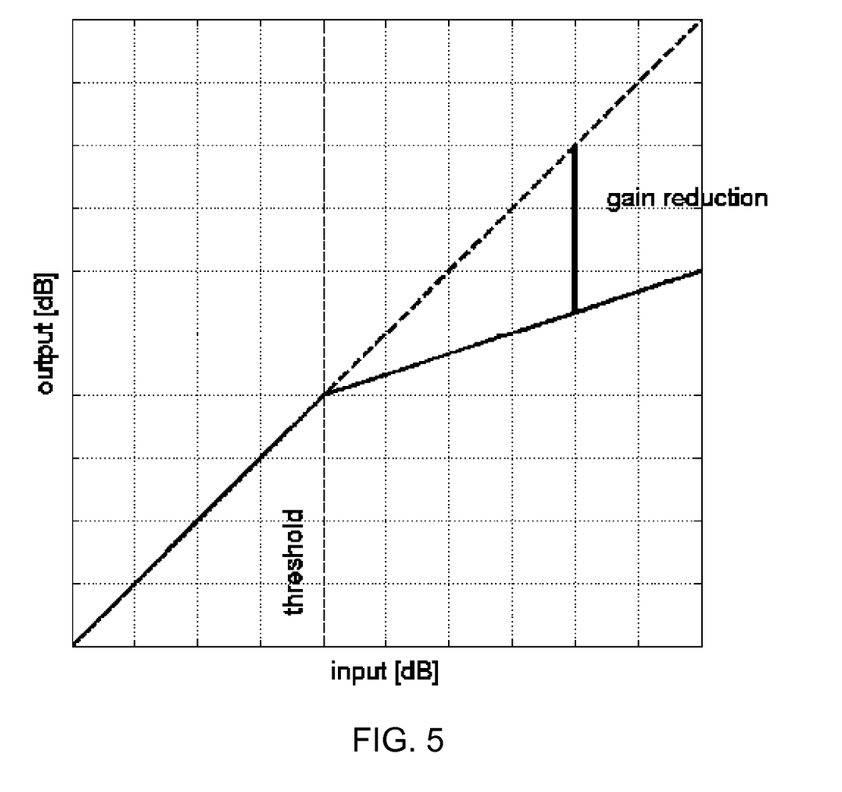
FIG. 5 is used to show the effect of a dynamic range compressor.

The effect of a dynamic range compressor is illustrated in FIG. 5. A dynamic range compression module is aimed at reducing the dynamic range of audio signals, i.e., it decreases the difference between high and low amplitude levels or volumes. The type of dynamic range compression is partly characterised by the compression curve, an example of which is shown in FIG. 5.

The gain is reduced by a certain amount if the signal level (power or amplitude) exceeds a compression threshold, which defines a knee in the input-output function. The signal level is computed as an asymmetrically smoothed version of the signal power or amplitude, which has an 'attack' time constant (used when the signal level increases) and a 'release' time constant (used when the signal level decreases). The gain reduction is computed from the compression curve and is traditionally expressed as a compression ratio. For example a compression ratio of 3:1 means that if the input signal level exceeds the compression threshold by 3 dB, the output signal level will exceed it by 1 dB.

Figure 6:
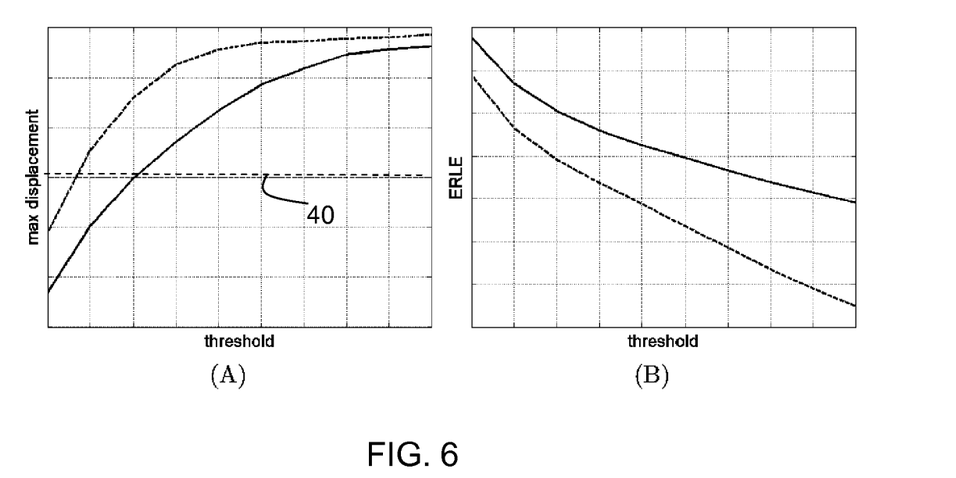
FIG. 6 is used to show the effect of DRC compression threshold on the maximal loudspeaker displacement (FIG. 6A) and on the ERLE (FIG. 6B)

FIG. 6 shows the effect of DRC compression threshold on the maximal loudspeaker displacement (FIG. 6A) and on the ERLE (FIG. 6B) for two music segments.

FIG. 6A shows that the maximal displacement increases when the value for the DRC compression threshold increases. The maximally allowed displacement that is provided by the manufacturer is again represented by the dashed, horizontal line 40. The diaphragm displacement exceeds this value when the DRC compression threshold exceeds a certain limit, and this will have a negative effect on the lifetime of the loudspeaker.

FIG. 6B shows that the ERLE decreases as a function of the DRC compression threshold, indicating that the non-linear behaviour of the loudspeaker becomes more prominent as the DRC compression threshold increases.

Figure 7:
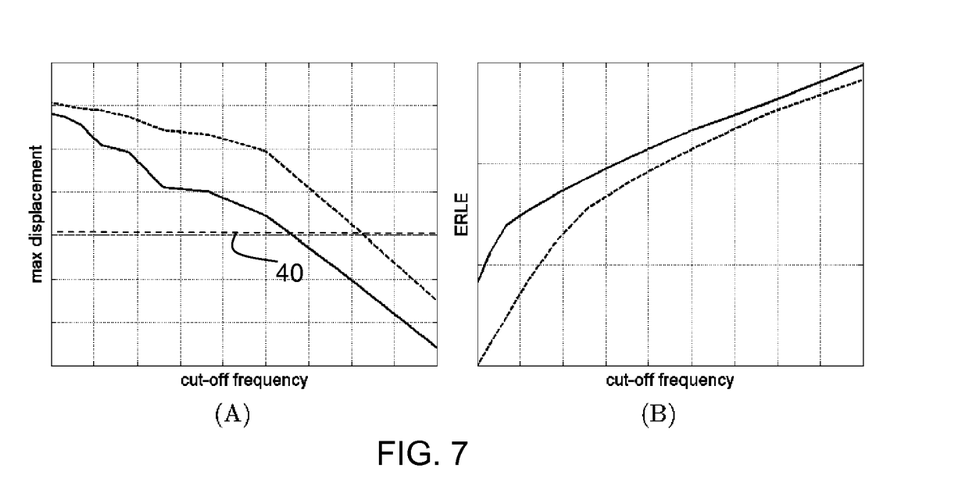
FIG. 7 is used to show the effect of the cut-off frequency of a high pass filter on the maximal loudspeaker displacement (FIG. 7A) and on the ERLE (FIG. 7B)

FIG. 7 shows the effect of the cut-off frequency of a high pass filter on the maximal loudspeaker displacement (FIG. 7A) and on the ERLE (FIG. 7B) for two music segments.

FIG. 7A shows that the maximal displacement decreases when the cut-off frequency increases. The maximally allowed displacement that is provided by the manufacturer is again represented by the dashed, horizontal line 40.

FIG. 7B shows that the ERLE increases as a function of the cut-off frequency, indicating that the non-linear behaviour of the loudspeaker becomes more prominent as the cut-off frequency of the high-pass filter decreases.

In summary, the non-linear behaviour of the loudspeaker becomes more prominent as the gain and the DRC compression threshold increase, and as the cut-off frequency of the high-pass filter decreases. Since most loudspeaker non-linearities are tightly linked to the diaphragm displacement, this means that the diaphragm displacement can be (indirectly) controlled by means of the processing parameters (DRC compression threshold, cut-off frequency, gain).

The diaphragm displacement cannot be measured without additional sensors, but the AEC performance can be measured, and can be used as a control variable, since it is an indirect measure of the displacement.

To illustrate the relationship between the AEC performance and the diaphragm displacement, a scatter plot of the maximal diaphragm displacement and the ERLE, both as a function of the gain (FIG. 8A), as a function of the DRC compression threshold (FIG. 8B) and as a function of the cut-off frequency of a high-pass filter (FIG. 8C) are shown for two music segments (solid and dashed curves).

Figure 8:
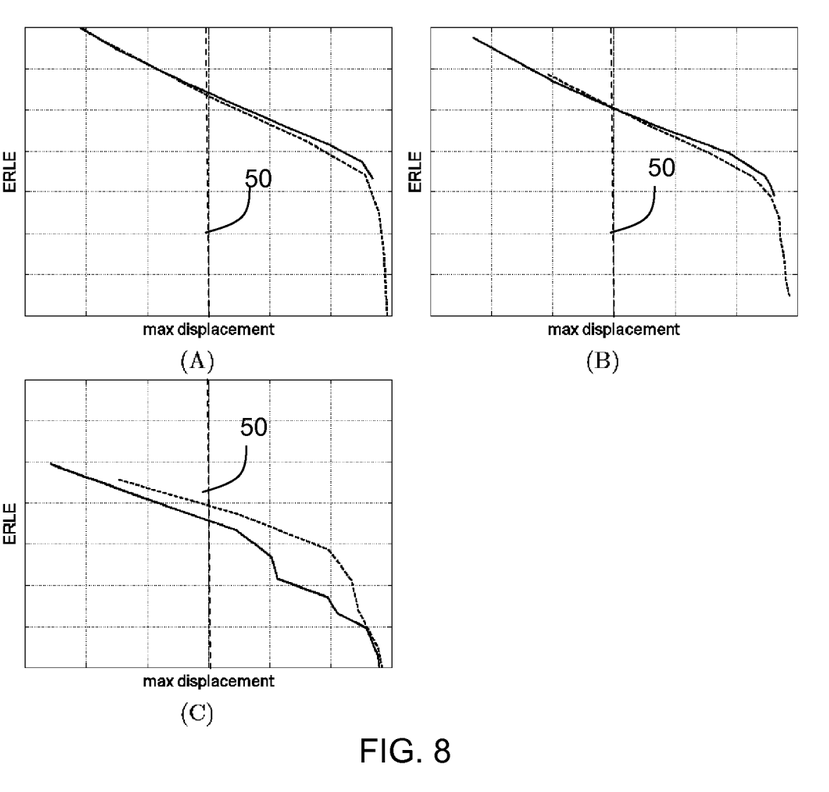
FIG. 8 is used to show the relationship between the AEC performance and the diaphragm displacement as a function of the gain (FIG. 8A) the DRC compression threshold (FIG. 8B) and the cut-off frequency of a high-pass filter (FIG. 8C)

It can be seen that the ERLE decreases as a function of the maximal diaphragm displacement (due to the increased non-linear behaviour of the loudspeaker as the diaphragm displacement increases). The maximal allowable displacement is represented by the dashed, vertical line 50. Furthermore, the ERLE versus diaphragm displacement measured for different music tracks (solid and dashed curves) are similar, even though the effects of the processing parameter (gain, DRC compression threshold and cut-off frequency) on the ERLE and diaphragm displacement are different for the two tracks.

Figure 9:
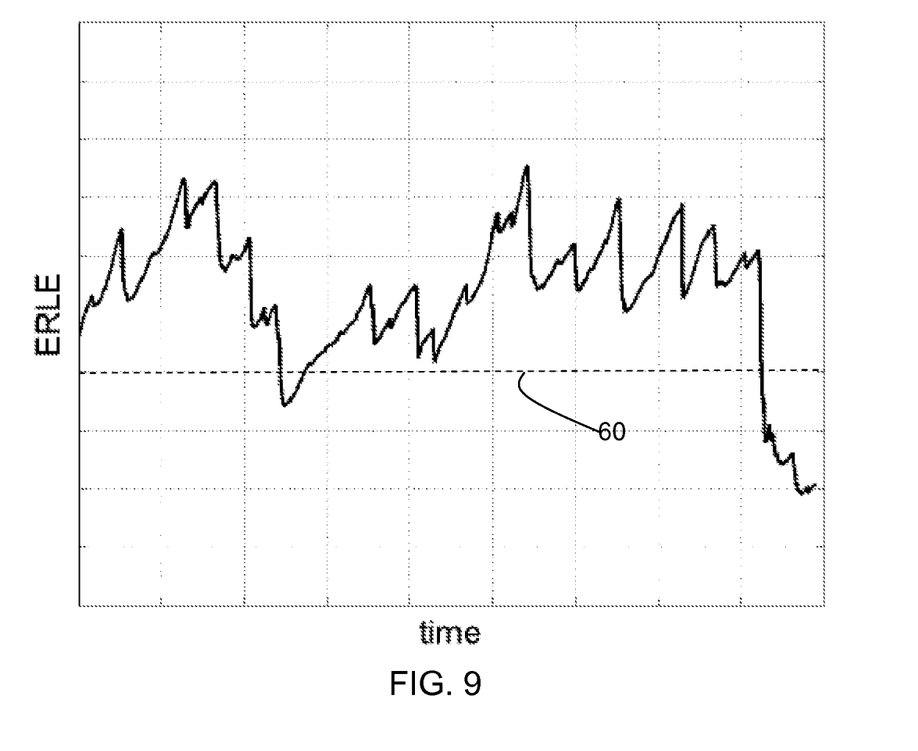
FIG. 9 shows the ERLE as a function of time.

For one 10-second segment for a fixed value of the DRC compression threshold, the ERLE is plotted as a function of time in FIG. 9 (the previous plots used averaged values across the 10-second segments). The maximal allowable displacement can be transformed into a lower bound for the ERLE using the relationships illustrated in the scatter plots (FIGS. 8A-C). This lower bound is represented by the dashed, horizontal line 60 in FIG. 9.

The invention can be implemented as a control scheme that controls the parameters of the processing in such a way that, on average, the ERLE coincides with the lower bound 60 for the ERLE. In this way, the parameters will be adjusted in such a way that the acoustic output is maximal, while the non-linearities are within bounds (due to which the diaphragm displacement is limited). This can be implemented, e.g., by increasing the gain and/or DRC compression threshold and/or decreasing the cut-off frequency of the high-pass filter when the ERLE is higher than the lower bound, and decreasing the gain and/or DRC compression threshold and/or increasing the cut-off frequency of the high-pass filter when the ERLE is lower than the lower bound.

An alternative control scheme can be implemented that only changes the parameters of the processing if the ERLE is below the lower bound. This way, the loudspeaker is mechanically protected without maximising the acoustical output.

Since the invention monitors the performance of a linear AEC, the echo cancellation and/or suppression that is necessary for applications such as voice communications, is expected to improve. Indeed, algorithms for echo cancellation and suppression perform better if the echo path is approximately linear. Furthermore, the invention can be integrated into an echo suppression system, which may consist of a linear AEC, followed by spectral post-processing.

To implement the invention, the following components can be used as shown in FIG. 3:
  one or several output amplifiers connected to one or several loudspeakers;
  one or several microphone amplifiers connected to one or several microphones;
  digital-to-analog and analog-to-digital converters;
  a DSP or micro-controller implementing the method of the invention.

In a preferred implementation, the software implemented on the DSP or micro-controller contains the following components:
  an acoustic echo cancellation (AEC) algorithm, such as an adaptive filter;
  an adaptive processing module;
  a control module that evaluates the AEC and controls the adaptive processing module.

The invention can be used for the application of (mechanical) loudspeaker protection to increase the expected life-span of a loudspeaker in audio devices where a microphone is available, e.g., in mobile phones. The invention can also be used for maximising the loudness, while still protecting the loudspeakers. This is again of interest for mobile phones where lower-quality loudspeakers are often employed, but high acoustic output is desired.

The source signal at the input can be retrieved from a memory, or can be input to the DSP or microcontroller via an analogue-to-digital converter (ADC).

Figure 10:
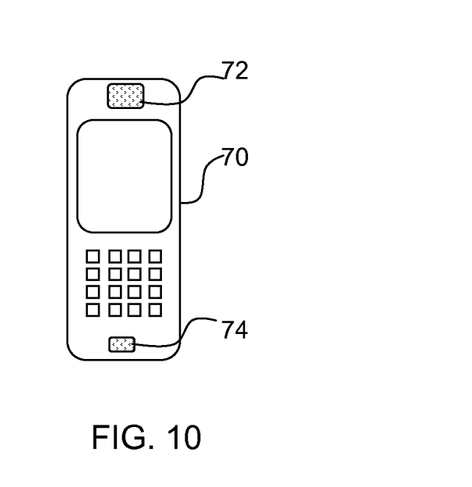
FIG. 10 shows a mobile phone including the loudspeaker system of the invention.

FIG. 10 shows a mobile phone 70 including the loudspeaker system 72 of the invention, including the microphone 74.

Only one example has been given above of echo cancellation approach. Other echo cancellation systems can be employed, and the performance again can be used as a measure of the degree of non-linearity in the output. Also, other methods that quantify the degree of non-linearity between two (sets of) signals can also be used instead of an echo cancellation system. For example, a non-linear function can be mapped to a signal derived from the signals being compared, and the coefficients of the non-linear terms can be observed as a measure of non-linearity. Of course, the advantage of using the echo cancellation system when present is that there is re-use of existing hardware/software.

The microphone can be the same microphone used for other functions of the device and does not need to be a dedicated microphone for the system.

Various modifications will be apparent to those skilled in the art.

The invention claimed is:

1. A loudspeaker drive circuit comprising:
  a loudspeaker driver;
  an input for receiving a signal from a microphone which detects the sound output of a loudspeaker having a diaphragm;
  a detector for detecting non-linearity between a drive signal to the loudspeaker and a microphone signal, wherein the detecting including calculating a ratio of the microphone signal and a residual signal, wherein the residual signal is calculated by subtracting the drive signal from the microphone signal; and
  a processor for processing an input signal before application to the loudspeaker driver, wherein the processor is adapted to alter a displacement of the diaphragm in an inverse proportion of magnitude of the detected non-linearity.

2. A circuit as claimed in claim 1, comprising an acoustic echo cancellation system, wherein the detector comprises structure for determining a performance of the echo cancellation system.

3. A circuit as claimed in claim 2, wherein the acoustic echo cancellation system comprises a delay element for delaying the drive signal to the loudspeaker, a filter for implementing a variable transfer function and a comparator for comparing the microphone signal with the delayed and filtered drive signal, and controlling the variable transfer function in response to the comparison result.

4. A circuit as claimed in claim 3, wherein the comparison result is used as an input to the processor.

5. A circuit as claimed in claim 2, wherein the echo-return-loss-enhancement performance of the acoustic echo cancellation system is used as the input to the processor.

6. A circuit as claimed in claim 5, wherein the processor is adapted to process the input signal such that the echo-return-loss-enhancement is not allowed to drop below a threshold level or such that the echo-return-loss-enhancement is maintained at a threshold level.

7. A circuit as claimed in claim 1, wherein the processor comprises structure for implementing dynamic range compression with a variable threshold value at which there is a knee in the dynamic range compression function.

8. A circuit as claimed in claim 1, wherein the processor comprises structure for implementing a variable gain.

9. A circuit as claimed in claim 1, wherein the processor comprises structure for implementing a filter function with variable cut-off frequency.

10. A loudspeaker circuit comprising a drive circuit as claimed in claim 1, a microphone and a loudspeaker driven by the drive circuit.

11. A method of controlling a loudspeaker, comprising:
detecting a sound output of the loudspeaker using a microphone, wherein the loudspeaker includes a diaphragm;
detecting non-linearity between a drive signal to the loudspeaker and the microphone signal, wherein the detecting including calculating a ratio of the microphone signal and a residual signal, wherein the residual signal is calculated by subtracting the drive signal from the microphone signal; and
processing an input signal before application to a loudspeaker driver wherein the processing includes changing the input signal to alter a displacement of the diaphragm in an inverse proportion of magnitude of the detected non-linearity.

12. A method as claimed in claim 11, wherein the processing comprises implementing dynamic range compression with a variable threshold value at which there is a knee in the dynamic range compression function, and/or implementing a variable gain function and/or implementing a filter function with variable cut-off frequency.

13. A method as claimed in claim 11, wherein detecting non-linearity comprises implementing acoustic echo cancellation by delaying the drive signal to the loudspeaker, implementing a variable filter transfer function, comparing the microphone signal with the delayed and filtered drive signal, and controlling the variable transfer function in response to the comparison result, wherein the comparison result is used for detecting the non-linearity.

14. A method as claimed in claim 13 wherein the echo-return-loss-enhancement performance of the acoustic echo cancellation is used in the processing.

15. A method as claimed in claim 14, comprising processing the input signal such that the echo-return-loss-enhancement is not allowed to drop below a threshold level or is maintained at a threshold level.

* * * * *